United States Patent Office 2,694,830
Patented Nov. 23, 1954

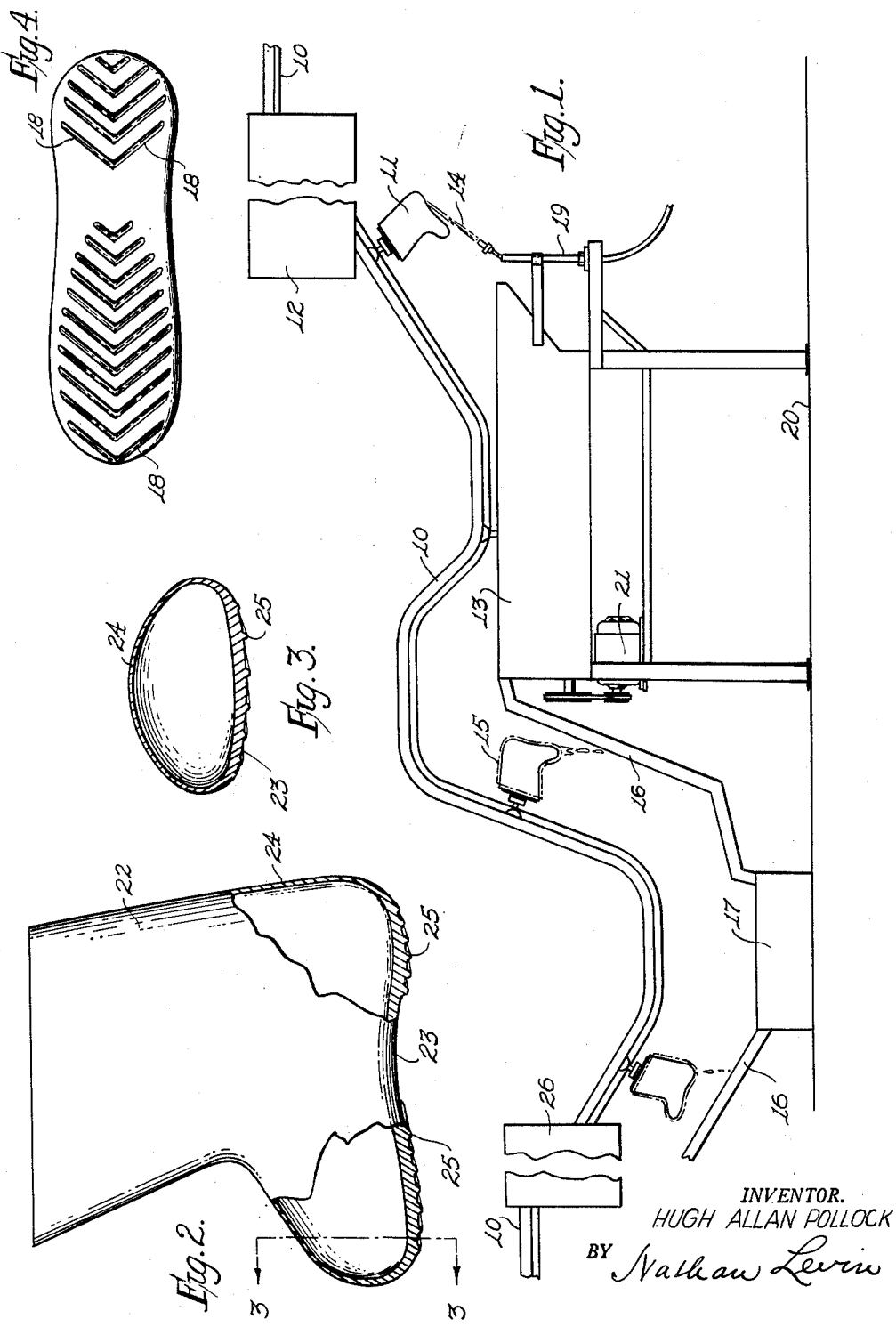

2,694,830

DIP MOLDING PROCESS AND APPARATUS THEREFOR

Hugh Allan Pollock, Los Angeles, Calif., assignor to Peek-A-Boot Inc., Los Angeles, Calif., a corporation of California Application August 13, 1953, Serial No. 374,068

9 Claims. (Cl. 18—24)

This invention relates to the art of dip molding by means of which hollow articles of elastic character such as waterproof footwear or the like may be formed.

According to the invention a preheated mold of suitable shape is dipped into a molding material having physical characteristics of a heavy cream-like consistency while in the uncured state and which when cured by heating after the dipping operation, results in an elastic-like material which may be stripped from the mold, the stripping operation reversing the material so that the mold-side thereof becomes the outside of the article. The size and shape of the mold plus the cured material determining the size and shape of the finished article. Generally this operation results in an article of uniform material thickness. In the present invention it is desired to form waterproof footwear, known as rain boots, in which the bottoms are of thicker material and are corrugated to provide for longer wear and to reduce slippage to a minimum.

It is an object of the present invention to provide dip-molded hollow articles with portions thereof of varying thicknesses.

It is also an object of the invention to provide dip-molded rain boots with reinforced bottoms.

A still further object of the invention is to provide a continuous conveyor belt-line method of dip-molding in which the temperature of a portion of each mold is caused to be higher than the temperature of the remainder of the mold at the time of the dipping step in the dip-molding operation.

A still further object of the invention is to provide a dip-molding method of producing one-piece waterproof footwear having reinforced anti-slip bottoms and which results in a particularly economical mode of manufacture of such articles requiring a minimum of manufacturing operations.

Other purposes and objects of the invention will be apparent from the following specification taken in conjunction with the accompanying drawings and in the appended claims.

In the drawings,

Figure 1 illustrates a portion of a continuous conveyor belt-line operation of dip-molding footwear, Figure 2 illustrates a finished article of footwear with the reinforced and corrugated bottom, Figure 3 is a sectional view on line 3—3 of Figure 2, and Figure 4 is a view illustrating the bottom surface of the forming mold and, in reverse, the bottom of the article of footwear.

In a continuous conveyor operation of dip-molding to form waterproof footwear, a number of forming molds are attached at intervals to the conveyor belt or chain and travel an endless path through the various steps of the cycle of operations. The molds pass through a stationary preheating oven, then are directed to a tank of the forming material into which they are dipped, then travel on at a particular angle to allow the excess material to drain from the molds, then to a drying or curing oven, and then on to a stripping station where the finished articles are manually removed from the molds and are reversed at the same time, to complete the cycle. In the present invention means are provided at a station just prior to the dipping step to further preheat the underside of the foot portiton of the traveling molds so that the said portions are of a higher temperature than the remaining portions of the molds, with the result that in the dipping step more material will adhere to the said underside portions than to the remaining portions of the molds. As a result thereof, after the cycle of operations has been completed, the bottoms of the finished footwear will be reinforced and will be thicker than the rest of the footwear. It will be obvious that the additional preheating may also be applied, if desired, at any other portion of the molds to provide reinforcing at the corresponding portions of the finished articles.

In Figure 1 of the drawings, a traveling endless conveyer line is indicated at 10, to which footwear forming molds 11 are affixed at intervals so that as the line of molds passes through the preheating oven 12, they are heated to a temperature of approximately 350 degrees Fahrenheit. After leaving the oven 12 and just before entering the material containing tank 13, the molds pass a station at which gas flame 14 is directed to their undersurfaces to further preheat these surfaces to a temperature of approximately 2000 degrees Fahrenheit. The molds pass down into the tank 13 to be dipped and then up out of the tank with a material coating thereon shown by the phantom lines 15. As the molds move on, the conveyor line is inclined downwardly so that excess material may drip onto the pans 16 and into recovery tank 17. It will be noted that the molds are positioned toe-down with the bottoms substantially upright for dripping and this is important for it permits the excess to drain freely and to leave the articles free of defect-forming air bubbles. As shown in Figure 4, the spaced grooves 18 on the undersurface of the mold foot extend at an angle toward the mold toe, the grooves meeting at approximately right angles along the centerline of the mold so that the excess material may drain out of the grooves when the molds are in their toe-down position. The dipped molds then pass through curing oven 26, the conveyer line 10, to the left of oven 26 being directed (not shown) to and joining with the end of the conveyer shown to the right of preheat oven 12 to provide the continuous line. A stripping station is provided at an appropriate place between ovens 12 and 26. The cycle of operations continues, as above set out, to form footwear with corrugated reinforced undersurfaces. It will be obvious that certain finishing operations may be carried out on the stripped footwear, such as trimming of excess material and applying means, such as ties or other closures, by which the footwear may be held in place for wear.

It will be understood that means other than gas flame 14 may be used without departing from the invention. The flame 14 is directed by a burner 19 suitably positioned and in this instance secured to tank 13. Tank 13, suitably positioned above floor line 20, is provided with a motor 21 suitably connected by a belt drive to an agitator (not shown) within the tank to keep the material in circulation. The tank is also provided with refrigerating coils (not shown) by means of which the temperature of the material may be kept between 75 degrees to 80 degrees Fahrenheit since otherwise the introduction of the heated molds would tend to raise the temperature of the material. Although various heat curable materials which are initially fluid in character may be employed in the present process, such as some of the rubber compounds, rubber latices or resilient synthetic plastic compounds, it is preferred that the material be a plastic compound which will result in a plastic rain boot.

As seen in Figures 2 and 3 the finished rain boot is shown at 22 having a corrugated reinforced bottom 23 of greater material thickness than the material thickness 24 which extends over the remainder of the boot. The spaced upstanding ridges 25, forming the anti-slipping corrugations, are formed by the material which entered the grooves 18 of the mold, and these extend from the thickened surface 23. It should be understood that where the mold is smooth and highly polished that the cured material may be transparent and will have a smooth highly polished surface and that where the mold is not polished the material will have a cloudy or roughened surface and will not be transparent and since the bottom of the mold is not polished it follows that the reinforced corrugated boot bottom will be non-transparent and will have a roughened surface.

The material at the sides of the foot, between the thicker bottom 23 and the thinner upper 24, gradually varies in thickness due to the bottom heating operation.

It will be appreciated that in the production of articles according to the present process the reinforced wall thickness of the finished articles is controlled by heating a plurality of molds by a single means as they pass by a station during the conveyor cycle of operations.

I claim:

1. In the process of forming a hollow article by dip molding in which a preheated mold is dipped into a liquid heat-curable composition which becomes elastic material after curing and which may be stripped from the mold, the step of raising the temperature of a portion of the preheated mold prior to the dipping operation so that in the dipping operation said portion picks up more of said composition than the remainder of the mold with the result that after the curing operation the thickness of the elastic material formed over the additionally heated portion of the mold is greater than that of the material formed over the remainder therof, the thicker material reinforcing the article.

2. In the process of forming waterproof footwear by dip molding in which a preheated appropriately shaped mold is dipped into a liquid heat-curable composition which becomes elastic material after curing and which may be stripped from the mold, the step of raising the temperature of the bottom of the preheated mold prior to the dipping operation so that in the dipping operation said portion picks up more of said composition than the remainder of the mold with the result that after curing operation the thickness of the elastic material forming the bottom of said footwear is greater than that of the material forming the remainder thereof.

3. The process according to claim 1 in which the temperature of the preheated mold is approximately 350 degrees Fahrenheit and the temperature of the additionally heated portion of the mold is approximately 2000 degrees Fahrenheit.

4. In the process of forming hollow articles by dip molding in which a number of spaced molds are continuously conveyed in an endless path during which they pass through a preheating oven, are dipped into and pass through a liquid heat-curable composition, pass through a curing oven where said composition becomes elastic material, and pass a station where the article forming material is stripped from the molds, the step of raising the temperature of a portion of each of the moving preheated molds at a station prior to the dipping operation so that in the dipping operation said portions pick up more of said composition than the remainder of the molds with the result that after passing through the curing oven the thickness of the elastic material formed over the additionally heated portions of the molds is greater than that of the material formed over the remainder thereof, the thicker material reinforcing the article.

5. In apparatus for forming hollow articles by dip molding in which a number of spaced molds are continuously conveyd in an endless path during which they pass through a preheating oven, are dipped into and pass through a liquid heat-curable composition, pass through a curing oven where said composition becomes elastic material, and pass a station where the article forming material is stripped from the molds, means for raising the temperature of a portion of each of the moving preheated molds at a station prior to the dipping operation so that in the dipping operation said portions pick up more of said composition than the remainder of the molds with the result that after passing through the curing oven the thickness of the elastic material formed over the additionally heated portions of the molds is greater than that of the material formed over the remainder therof, the thicker material reinforcing the article.

6. In the apparatus according to claim 5 in which the said means for raising the temperature of a portion of each of the moving preheated molds comprises a gas flame directed to the said portions of the molds as they travel past the said flame.

7. In the process according to claim 4 the step of positioning the molds after the dipping operation so that their additionally heated portions are in substantially vertical planes for drainage of excess material.

8. In the process of forming plastic waterproof footwear by dip molding in which a number of spaced foot-shaped molds are continuously conveyed in an endless path during which they pass through a preheating oven, are dipped into and pass through a liquid heat-curable plastic composition, pass through a curing oven where said composition becomes plastic, and pass a station where the footwear is stripped from the molds, the step of providing molds with foot bottoms having a series of toe-pointing spaced grooves, the step of raising the temperature of said grooved bottoms of each of the moving preheated molds at a station prior to the dipping operation so that in the dipping operation said bottoms pick up more of said composition than the remainder of the molds with the result that after passing through the curing oven the thickness of the plastic formed over the ridged bottoms is greater than that of the plastic formed over the remainder of the molds, the thicker material reinforcing the footwear bottoms and providing a series of spaced upstanding ridges.

9. In the process according to claim 8 the step of arranging the molds in toe-down position after the dipping operation with said bottoms in substantially vertically planes for drainage of excess material from said toe-pointing grooves.

References Cited in the file of this patent

UNITED STATES PATENTS

| Number | Name | Date |
|---|---|---|
| Re. 18,437 | Pestalozza | Apr. 26, 1932 |
| 1,193,883 | Emery | Aug. 8, 1916 |
| 1,750,540 | Pestalozza | Mar. 11, 1930 |
| 1,825,738 | Klein et al. | Oct. 6, 1931 |
| 2,149,102 | Quennard | Feb. 28, 1939 |
| 2,617,208 | Marx et al. | Nov. 11, 1952 |
| 2,652,637 | Hardman | Sept. 22, 1953 |